US008733416B2

(12) United States Patent
Herard

(10) Patent No.: US 8,733,416 B2
(45) Date of Patent: May 27, 2014

(54) LABEL APPLICATOR

(75) Inventor: Raymond Herard, North Charleston, SC (US)

(73) Assignee: The United States of America as represented by the Department of Veterans Affairs, Washington, DC (US)

( * ) Notice: Subject to any disclaimer, the term of this patent is extended or adjusted under 35 U.S.C. 154(b) by 25 days.

(21) Appl. No.: 13/234,051

(22) Filed: Sep. 15, 2011

(65) Prior Publication Data

US 2012/0090761 A1 Apr. 19, 2012

Related U.S. Application Data

(60) Provisional application No. 61/382,992, filed on Sep. 15, 2010.

(51) Int. Cl.

| | |
|---|---|
| ***B29C 65/00*** | (2006.01) |
| ***B32B 37/00*** | (2006.01) |
| ***B32B 41/00*** | (2006.01) |
| ***B65C 9/40*** | (2006.01) |
| ***G05G 15/00*** | (2006.01) |

(52) U.S. Cl.
USPC .......... 156/363; 156/358; 156/446; 156/521; 156/566; 156/361

(58) Field of Classification Search
USPC .......... 156/351, 363, 446, 521, 566, 361, 358
See application file for complete search history.

(56) References Cited

U.S. PATENT DOCUMENTS 2,344,185 A * 3/1944 Tuthill .......................... 156/351
2006/0027304 A1* 2/2006 Fujita .............................. 156/64

* cited by examiner

*Primary Examiner* — Linda L. Gray
(74) *Attorney, Agent, or Firm* — Klarquist Sparkman, LLP

(57) ABSTRACT

A method for positioning an article within a label applicator and securing the article between a first roller, a second roller, and a moveable contact member includes securing the article by moving the moveable contact member from a first position in which the moveable contact member is not in contact with the article to a second position in which the moveable contact member is in contact with the article. A label is received for application to the article by delivering the label between the article and at least one of the first roller, second roller, and the moveable contact member.

16 Claims, 5 Drawing Sheets

LABEL APPLICATOR

CROSS REFERENCE TO RELATED APPLICATION

This application claims the benefit of U.S. Provisional Application No. 61/382,992, filed on Sep. 15, 2010 and incorporated herein by reference in its entirety.

FIELD

This disclosure relates, in general, to methods and apparatuses for applying labels to various items.

BACKGROUND

Labels are commonly applied to various articles, including containers, to indicate the contents of the container and/or to provide other information about the article or container. Conventional labeling devices, however, are not well-suited for applying labels to articles or containers of different sizes or shapes. For this reason, multiple labeling devices are generally required to apply labels to articles of different shapes and sizes.

Since multiple labeling devices are required to label different size articles or containers, the cost associated with labeling various types of articles and containers can be significant. In addition, the use of multiple labeling devices can greatly reduce the speed in which labels can be applied, since the operator must constantly switch between different labeling devices when applying labels to articles of different shapes and/or sizes.

SUMMARY

The systems and methods described herein provide a labeling system with great flexibility because the system can accommodate articles of various shapes and sizes. In one embodiment, a method of applying a label to an article is provided. The method includes positioning an article within a label applicator and securing the article between a first roller, a second roller, and a moveable contact member. The article is secured by moving the moveable contact member from a first position in which the moveable contact member is not in contact with the article to a second position in which the moveable contact member is in contact with the article. A label is received for application to the article and the label is delivered between the article and at least one of the first roller, second roller, and the moveable contact member. The label has a first side with printed matter thereon and a second side configured for attachment to a surface of the article. At least one of the first roller, second roller, and the moveable contact member is rotated to cause the article to rotate and the label is applied to the article as the label is delivered between the article and the at least one of the first roller, second roller, and the moveable contact member. The first side of the label contacts at least one of the first roller, second roller, and moveable contact member, and the second side of the label contacts the surface of the article. In some instances, the moveable contact member can be a moveable third roller.

The act of rotating at least one of the first roller, second roller, and the moveable contact member to cause the article to rotate can be achieved by rotating a drive shaft coupled to a drive belt to drive at least one of the first roller, second roller, and the moveable contact member. The drive belt can be configured to drive at least the moveable contact member. In some instances, the label is a pressure-sensitive label that has been cut and stripped of a release backing so that it can be applied to the article. The act of delivering the label can also include guiding the label between the article and at least one of the first roller, second roller, and the moveable contact member by directing air at the label.

The method can further include detecting the presence of the article in the label applicator using a first sensor and/or detecting the presence of the label as it is received for application to the article using a second sensor. In some instances, the rotation of at least one of the first roller, second roller, and the moveable contact member can be controlled based on information received from the first and second sensors. The article can be supported within the label applicator by moving a moveable platform into a first position onto which the article can be supported as the article is positioned in the label applicator. The labeled article can be discharged from the label applicator by moving the moveable platform into a second position after the label is applied to the article, wherein the moveable platform does not support the article in the second position.

In another embodiment, an apparatus for attaching labels to articles is provided. The apparatus can include a first roller, a second roller, a moveable contact member, an actuator configured to move the moveable contact member from a first position to a second position, and a label inlet opening for receiving a label. An article-receiving area and a label-receiving area can be provided. The article-receiving area is defined by an area between the first roller, the second roller, and the moveable contact member when the moveable contact member is in the first position. The article-receiving area is sized to receive an article without contacting each of the first roller, the second roller, and the moveable contact member at the same time. In other words, at least one of the first roller, second roller, and moveable contact member are spaced from the article when the moveable contact member is in the first position. The label-receiving area is defined by the area between the first roller, the second roller, and the moveable contact member when the moveable contact member is in the second position. The label-receiving area is sized to hold the article in contact with each of the first roller, the second roller, and the moveable contact member. The label-receiving area can be smaller than the article-receiving area, and the moveable contact member can comprise a third roller.

In other embodiments, a motor and at least one drive belt can be provided. The drive belt can be configured to cause at least one of the first roller, the second roller, and the moveable contact member to rotate. One or more sensors can be provided. For example, a first sensor can be positioned adjacent the article-receiving area and configured to detect the presence of an article within the article-receiving area. A second sensor can be positioned adjacent the label inlet opening and configured to detect the presence of a label in the vicinity of the label inlet opening. In some embodiments, a control system is provided for controlling the movement of the actuator based on information received from the first and second sensors.

In other embodiments, a platform can be provided that is moveable between a first position and a second position. An opening can be located beneath the platform when the platform is in the first position. In the first position, the platform is positioned to support an article and, in the second position, the platform does not support the article, thereby permitting the article to pass through the opening.

In another embodiment, a labeling system is provided. The system includes a label generating device configured to generate labels with a first side of printed matter and a second side with a pressure-sensitive adhesive, and at least three rollers that are spaced apart from one another to define an article-receiving area that is sized to receive an article. A label guide member can be configured to direct a label from the label generating device toward one of the at least three rollers, and one of the three rollers can be a moveable roller that is configured to move from a first position to a second position to reduce the size of the article-receiving area.

In some embodiments, the label generating device can be configured to cut labels from a continuous roll of label material and strip a release backing from the continuous roll of label material. Sensors can also be provided. For example, at least one sensor can be configured to detect the presence of an article positioned within the labeling system. A control system can be configured to control the delivery of labels from the labeling system based on a response received from the at least one sensor, the control system being configured to control the movement of the moveable roller between the first and second positions. The labeling system can also include a motor and at least one drive belt, with the drive belt being configured to cause at least one of the three rollers to rotate when the moveable roller is in the second position.

The foregoing and other objects, features, and advantages of the invention will become more apparent from the following detailed description, which proceeds with reference to the accompanying figures.

DETAILED DESCRIPTION

The following description is exemplary in nature and is not intended to limit the scope, applicability, or configuration of the invention in any way. Various changes to the described embodiment may be made in the function and arrangement of the elements described herein without departing from the scope of the invention.

As used in this application and in the claims, the singular forms "a," "an," and "the" include the plural forms unless the context clearly dictates otherwise. Additionally, the term "includes" means "comprises." As used herein, the term "article" refers to an object onto which a label can be applied. The term "article" can be a container, in which various items can be placed and/or stored, as well as objects that are not configured to receive and/or store items (such as solid-body objects).

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

Moreover, for the sake of simplicity, the attached figures may not show the various ways (readily discernible, based on this disclosure, by one of ordinary skill in the art) in which the disclosed methods and apparatuses can be used in combination with other methods and apparatuses. Additionally, the description sometimes uses terms such as "produce" and "provide" to describe the disclosed method. These terms are high-level abstractions of the actual operations that can be performed. The actual operations that correspond to these terms can vary depending on the particular implementation and are, based on this disclosure, readily discernible by one of ordinary skill in the art.

Figure 1:
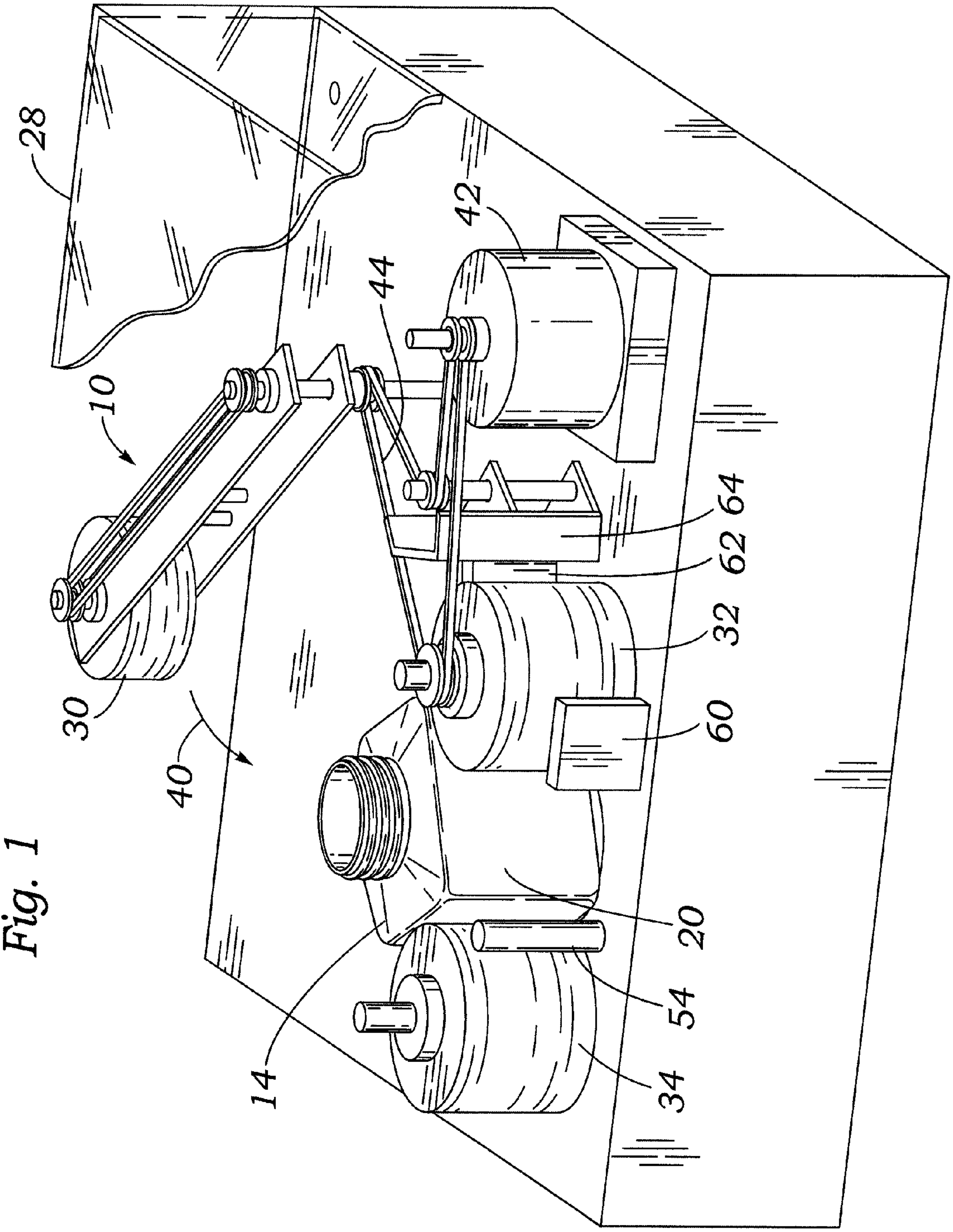
FIG. 1 illustrates a perspective view of a label applicator, shown with the cover partially removed for clarity and with a moveable contact member in a first position.
Figure 2:
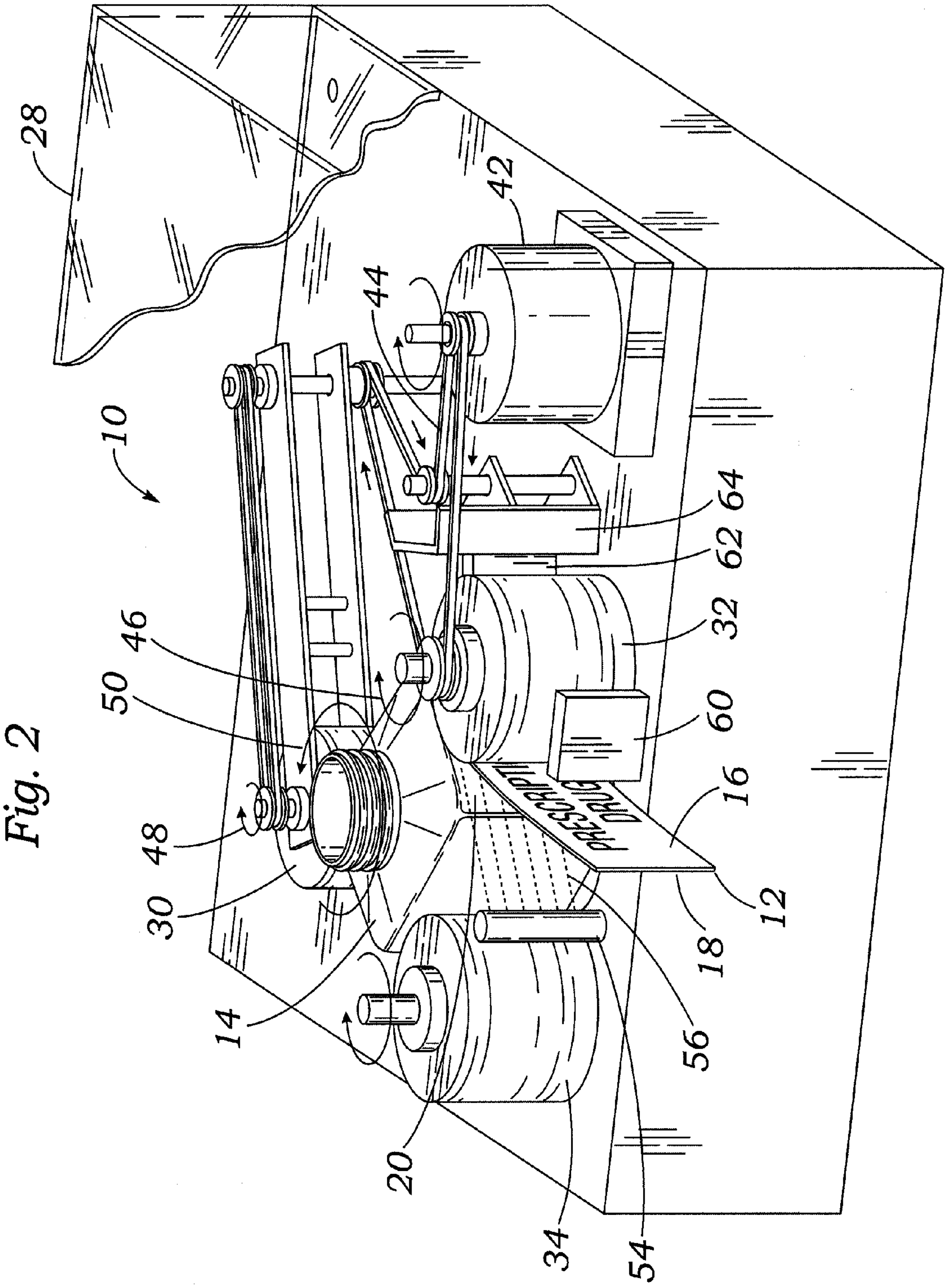
FIG. 2 illustrates a perspective view of a label applicator, shown with the cover partially removed for clarity and with the moveable contact member in a second position.
Figure 4:
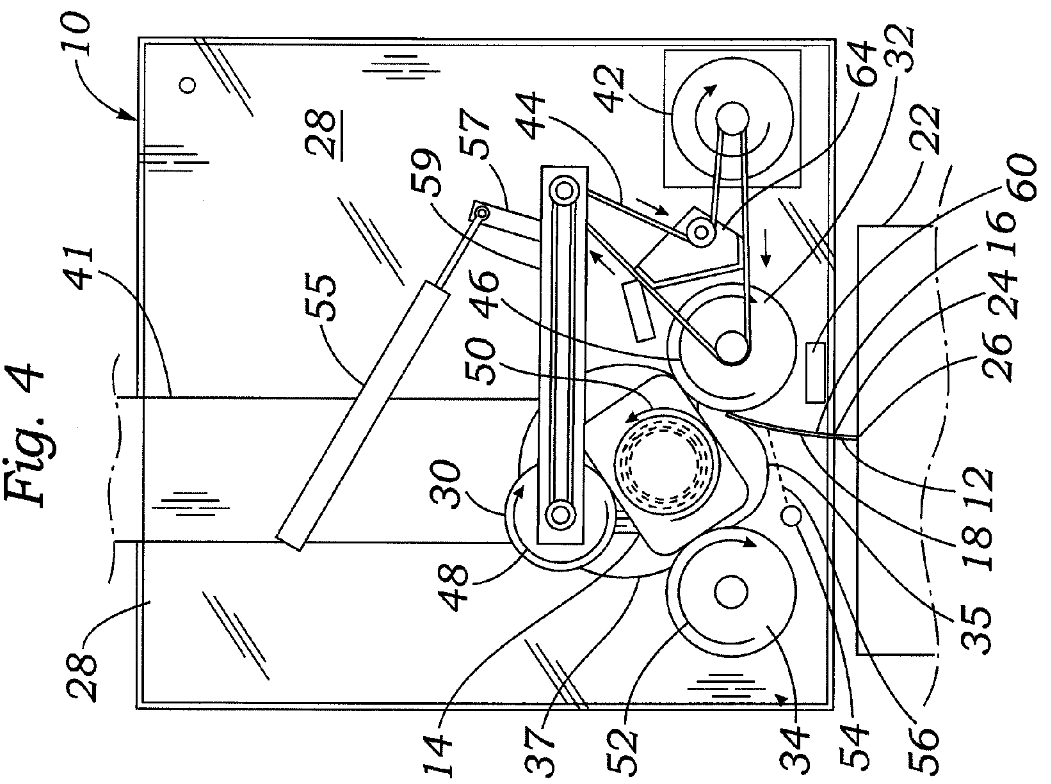
FIG. 4 illustrates a top view of a label applicator, shown with a transparent cover for clarity and with the moveable contact member in a second position.
Figure 3:
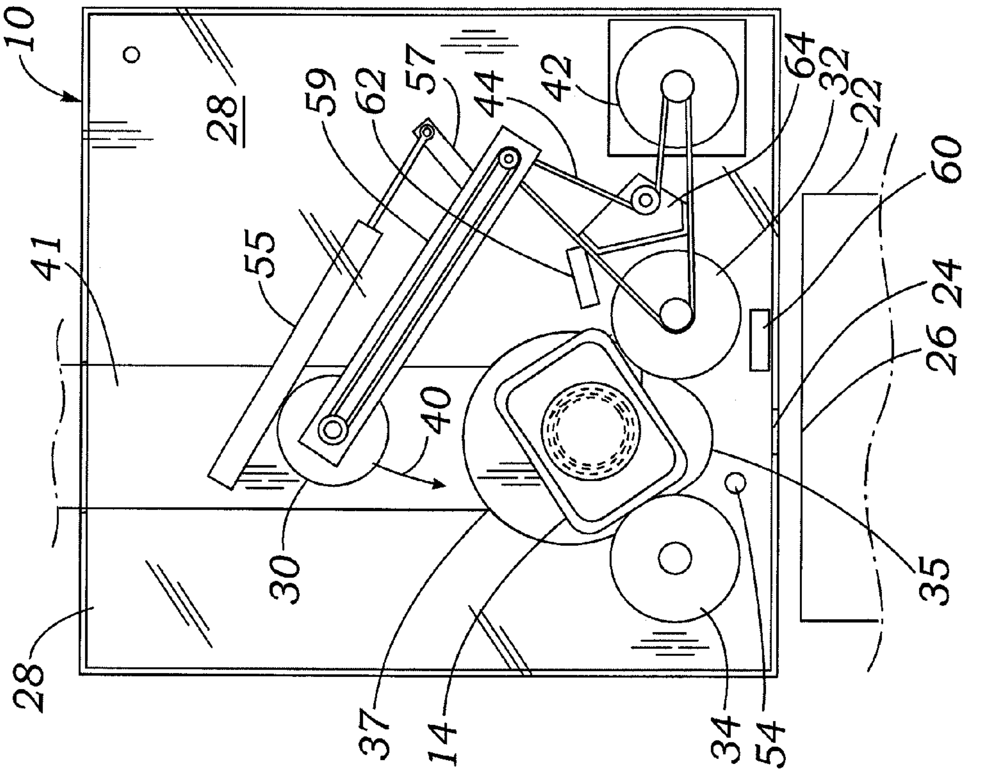
FIG. 3 illustrates a top view of a label applicator, shown with a transparent cover for clarity and with a moveable contact member in a first position.
Figure 5:
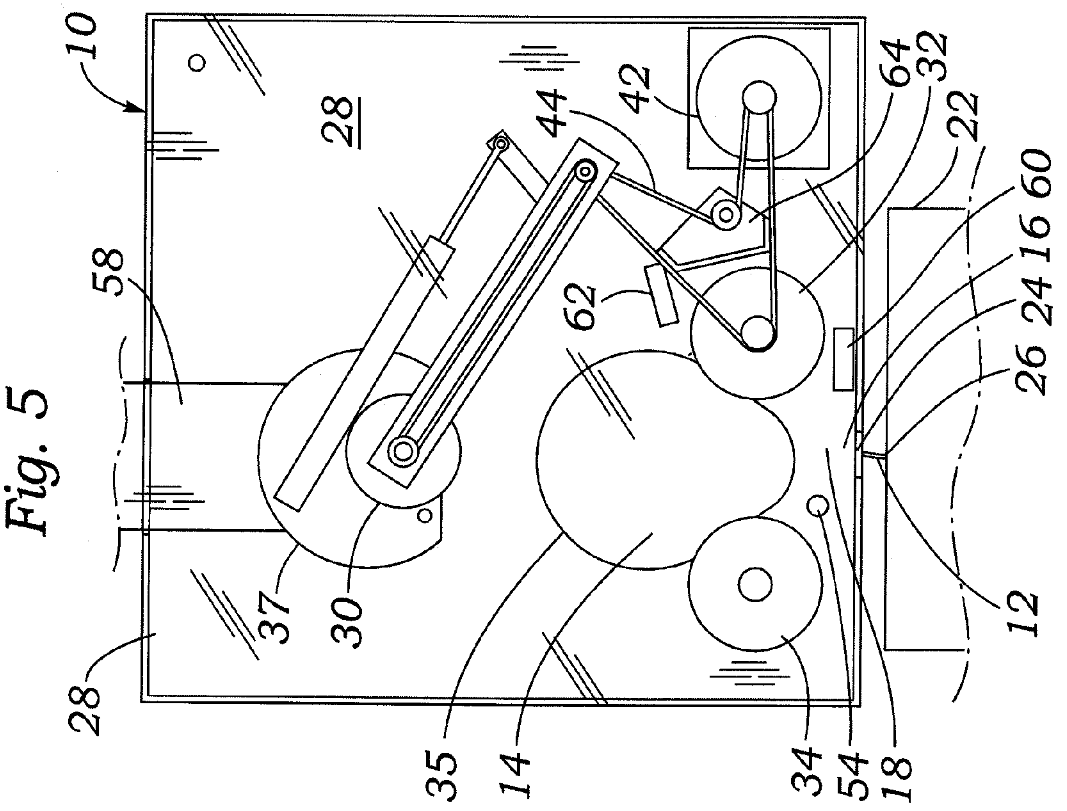
FIG. 5 illustrates a top view of a label applicator, shown with a transparent cover for clarity and with the moveable contact member returning to the first position.

FIGS. 1-5 illustrate various views of an embodiment of a label applicator 10 that can be used to apply a label 12 to an article 14. Label applicator 10 can include an optional cover 28 to protect the moving parts of the applicator from exposure to the environment. For convenience, FIGS. 1-5 illustrate label applicator 10 with a cover 28 that is transparent. However, it should be understood that if a cover is provided, the cover need not be transparent and can take a variety of forms and can be formed of a variety of materials. FIGS. 1 and 2 illustrate a perspective view of label applicator 10 with cover 28 partially removed for clarity, while FIGS. 3-5 illustrate top views of label applicator 10 with cover 28 present, but illustrated as transparent to show portions of the label applicator below cover 28.

FIGS. 1 and 3 illustrate a moveable contact member 30 in a first position and FIGS. 2 and 4 illustrate moveable contact member 30 in a second position. As described in more detail below, in the first position (FIGS. 1 and 3), moveable contact member 30 is in a position that facilitates entry of article 14 into label applicator 10, while in the second position (FIGS. 2 and 4), moveable contact member 30 is moved to a position whereby moveable contact member 30 contacts article 14 after it is positioned within label applicator 10. As described in more detail below, the second position of moveable contact member can vary to accommodate articles 14 of different sizes and shapes.

Referring to FIGS. 2 and 4, label 12 can be any label that has a first side 16 with visible matter thereon and a second side 18 that can be attached to a surface of article 14. The visible matter on first side 16 can comprise printed matter and/or any other graphical depiction that conveys information about the article or about an object that is or will be stored within the article. Second side 18 of label 12 can comprise a material that facilitates attachment of second side 18 to an outer surface 20 of article 14. In the embodiment shown in FIGS. 2 and 4, a pressure-sensitive adhesive is applied to at least a portion of second side 18 to facilitate attachment of that side of the label to outer surface 20 of article 14.

Label 12 can be prepared and delivered to label applicator 10 by a label generating device 22 (shown, e.g., in FIGS. 3 and 4). Label generating device 22 can comprise any device or system capable of preparing a label that can be used with label applicator 10, such as the pressure-sensitive label shown in FIGS. 2 and 4. For example, label generating device 22 can comprise an Intermac or Datamax thermal printer. Label generating device 22 can be positioned adjacent an opening 24 in a side of label applicator 10 (e.g., an opening in a side surface of a side wall of label applicator 10) to facilitate delivery of labels 12 to label applicator 10. To improve the accuracy of the delivery of labels to label applicator 10, label generating device 22 can be coupled to label applicator 10.

Label generating device 22 can have a cutting tool that can cut one or more labels from a continuous roll of label material. In addition, if the roll of label material comprises a release material or other such backing materials on second side 18, label generating device 22 can have a stripping tool to remove the backing from the label prior to delivery of the label to label applicator 10. Thus, for example, if label 12 is formed from a roll of pressure-sensitive material with release material covering the pressure-sensitive side of the pressure-sensitive material, after the label is printed, label generating device 22 can remove the printed portion of the label from the release material, and expel the stripped, printed label 12 through an output port 26 (see, e.g., FIG. 4).

Alternatively, it should be understood that the cutting and stripping of labels can be performed by label applicator 10 or by an intermediate device or system positioned between label applicator 10 and label generating device 22.

In other embodiments, one or both of the cutting and stripping systems may not be needed. For example, if the labels are formed of materials that do not require a release material and/or which are pre-cut and therefore do not require further cutting and/or stripping, one or both of the cutting and stripping steps can be eliminated.

To apply a label 12 to article 14, article 14 is inserted into an article-receiving area within label applicator 10. Moveable contact member 30 is then moved towards article 14 until moveable contact member 30 contacts article 14. For example, as shown in FIGS. 1 and 3, after article 14 is positioned within the article-receiving area, moveable contact member 30 can be moved generally toward article 14 in the direction of arrow 40. As moveable contact member 30 is moved toward article 14, it eventually contacts article 14, thereby securing it within a label-receiving area between a first roller 32, a second roller 34, and moveable contact member 30 (which can also comprise a roller). Because moveable contact member 30 is movable between a variety of positions, the label-receiving area can accommodate both larger and smaller articles 14.

The article-receiving area can generally be defined as an area between first roller 32, second roller 34, and moveable contact member 30 when moveable contact member 30 is in the first position (FIGS. 1 and 3), while the label-receiving area can generally be defined as an area between first roller 32, second roller 34, and moveable contact member 30, when moveable contact member 30 is in the second position (FIGS. 2 and 4). The article-receiving area can be positioned directly under an opening (not shown) in the cover so that an article can be placed into the article-receiving area from a position above label applicator 10. The opening in the cover can be sized to accept articles of different sizes. In one embodiment, the opening in the cover can be generally the same size as the area between moveable contact member 30, first roller 32, and second roller 34, when moveable contact member 30 is in the first position (FIGS. 1 and 3). In that manner, the opening in the cover can accommodate as large an article as the article-receiving area will permit.

As shown in FIGS. 2 and 4, once article 14 is secured within the label-receiving area (e.g., the reduced-size article-receiving area that is between moveable contact member 30, first roller 32, and second roller 34), a label 12 can be delivered from output port 26 of label generating device 22 into opening 24 of label applicator 10. As shown in FIGS. 1-4, moveable contact member 30 can comprise a third roller, which is similar to first roller 32 and second roller 34, except that it is movable so that it can accommodate different size articles 14 within the label-receiving area.

At least one of the three rollers (i.e., first roller 32, second roller 34, and moveable contact member 30) comprises a drive roller which receives a driving force that cause that roller to rotate. For example, as shown in FIGS. 2 and 4, a motor 42 can be coupled to one or more drive belts 44 to drive at least one of the three rollers. By driving at least one of the three rollers, article 14 can be rotated between the three rollers. As article 14 rotates, it will in turn cause the rotation of any of the three rollers that are not already being driven by the motor or some other driving force.

In the exemplary embodiment shown in FIG. 4, drive belt 44 is configured to drive first roller 32 and moveable contact member 30 via drive shafts associated with each of rollers 32 and moveable contact member 30. This causes first roller 32 and moveable contact member 30 to rotate clockwise in the direction of arrows 46, 48. Because first roller 32 and moveable contact member 30 are in contact with article 14, the clockwise rotation of first roller 32 and moveable contact member 30 causes article 14 to rotate in a counter-clockwise direction as shown by arrow 50. Similarly, although roller 34 is not directly driven by drive belt 44, roller 34 rotates in a clockwise direction as shown by arrow 52 as a result of the counterclockwise motion of article 14. If desired, a belt tensioner 64 can be provided to maintain a desired amount of tension in the drive belt and/or other belts in the system.

Accordingly, as label 12 is delivered into opening 24 of label applicator 10, the second side 18 of label 12 is brought into contact with the outer surface 20 of article 14. As the drive rollers (e.g., first roller 32 and moveable contact member 30) cause article 14 to rotate in a counterclockwise direction, label 14 is squeezed between the outer surface 20 of article 14 and the external surface of first roller 32 and label 12 is coupled to the article.

Label 12 can be formed any desired length and width. Thus, for example, label 12 can be sized to surrounds at least a portion of article 14. FIG. 4, for example, illustrates a label that can surround at least one side of a square article. It should be understood however, that labels of different lengths and widths can be applied to an article by label applicator 10.

If desired, a label guide 54 can be provided to help guide label 12 into a desired position. For example, as shown in FIGS. 2 and 4, label guide 54 can be configured to direct air towards label 12 after label 12 approaches article 14. In one embodiment, label guide 54 can comprise one or more air jets or nozzles that direct air in the direction shown by arrows 56 against the second side 18 of label 12 to urge label 12 towards first roller 32. In this manner, label 12 can be directed into contact with first roller 32, the rotation of which pulls label 12 between first roller 32 and the outer surface 20 of article 14. As the label is squeezed between first roller 32 and the outer surface 20 of article 14, the pressure-sensitive adhesive on second side 18 of label 12 affixes label 12 to article 14.

Movement of moveable contact member 30 between the first position (for receiving an article as shown in FIGS. 1 and 3) and the second position (for applying a label to an article as shown in FIGS. 2 and 4) can be accomplished in a variety of manners. For example, label applicator 10 can comprise an actuating member 55 for adjusting the position of moveable contact member 30. Actuating member 55 can comprise any device or structure which causes the movement of moveable contact member 30 between the first and second positions. For example, in the embodiment shown in FIGS. 3 and 4, actuating member 55 comprises a linear actuator that is configured to shorten and lengthen to cause moveable contact member 30 to move between the first and second positions. Thus, for example, in FIG. 3 actuating member 55 is lengthened, which exerts a force on arm 57, which in turn causes the support mechanism 59 of moveable contact member 30 to move (i.e., pivot) away from article 14 (i.e., into the first position). As shown in FIG. 4, when actuating member 55 is shortened, arm 57 causes the support mechanism 59 to pivot so that moveable contact member 30 moves towards article 14 (i.e., into the second position).

Specific construction and operation of the actuating mechanism 55 can vary so long as the mechanism is capable of moving the moveable contact member 30 between a position that allows greater access to the label-receiving area and a position whereby the moveable contact member 30 is in contact with an article received in the label-receiving area. For example, moveable contact member 30 can be moveable along different trajectories between the first and second positions, including, for example, straight or curved trajectories. In some embodiments, the moveable contact member 30 can be biased towards the second position and the actuating mechanism can be configured to "hold-back" the moveable contact member 30 when it is in the first position.

FIGS. 3-5 also illustrate a manner in which article 14 can exit label applicator 10 in a direction other than that which article 14 entered the label applicator. Thus, for example, an opening 35 can be provided so that articles 14 can exit the label applicator from below. To hold article 14 in position for label application, a moveable platform 37 can be provided. Moveable platform 37 can be moveable between a blocking position, whereby moveable platform 37 block articles 14 from falling through opening 35, and an open position, whereby moveable platform 37 does not block articles from falling through opening 35. Moveable platform 37 can be moved between the blocking and non-blocking positions in various manners. For example, FIGS. 3-5 illustrate a linear actuator 41 that functions to move the moveable platform into and out of the path of opening 35.

Thus, as shown in FIGS. 3 and 4, while receiving an article and attaching a label to that article, moveable platform 37 is in the blocking position. However, as shown in FIG. 5, after the label is applied, moveable platform 37 can be withdrawn from opening 35, thereby allowing the article to fall through the opening 35. In this manner, after application of a label, articles can be quickly removed from the label applicator so that another article can be inserted and labeled.

Figure 6:
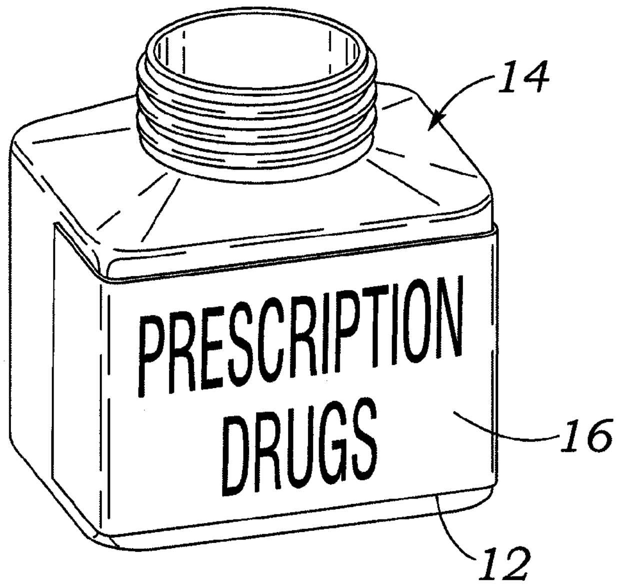
FIG. 6 illustrates an example of an article labeled by a label applicator.
Figure 7:
FIG. 7 illustrates another example of an article labeled by a label applicator.

As shown in FIGS. 6 and 7, in one example, label 12 can comprise a drug label that is attached to a container to describe the contents of the container. Such labels can include various medical information, such as, for example, the type of drug stored in the container, the dosage associated with that drug, and warnings and/or other indications for that drug. FIG. 6 illustrates an illustrative article 14 that comprises a square container and FIG. 7 illustrates an illustrative article that comprises a round container. FIGS. 6 and 7 simply illustrate two examples of shapes that can be labeled using the label applicators described herein. However, it should be understood that articles of various other shapes can be labeled using the label applicators described herein, including for example, any article with a plurality of curved and/or flat surfaces.

Although in some embodiments moveable contact member 30 and moveable platform 37 can be manually operable, label applicator 10 desirably comprises a control system for controlling the operation of the system. Thus, for example, the control system can control one or more of the actuating mechanism (including the movement of the moveable contact member 30), the label guide, the motor, and the delivery of the label to the label applicator. In some embodiments, the control system can comprise a microprocessor, input/output controls, a programmable logic controller (PLC), or similar control mechanisms.

In some embodiments, the label applicator can include one or more sensors to improve operation of the control system. For example, a label detection sensor 60 can be positioned adjacent the opening 24 to detect the presence of a label 12 entering label applicator 10. Label detection sensor 60 can inform the system that a label is in position and ready to be applied to an article. Also, an article detection sensor 62 can be positioned adjacent the label-receiving area to detect the presence of an article 14 in label applicator 10. Article detection sensor 62 can inform the control system when an article 14 has been placed into and/or removed from label applicator 10. The sensors used by the label applicator can vary. In some embodiments, for example, the sensor can comprise an IR sensor or other photoelectric sensors.

In some embodiments, the control system can utilize the sensors to determine the presence of an article and/or the availability of a label, thereby causing the system to take actions associated with applying the label to the article in response to those determinations. Thus, for example, the system can be configured to turn on the motor and begin driving one or more of the rollers upon detecting that an article is in the label-receiving area and a label is ready for application to the article.

In some embodiments, the control system can further control the speed at which the rollers rotate. In this manner, the control system can be configured to adjust the speed of the rollers to generally match the speed at which label generating device 22 discharges labels. In this manner, smooth and efficient label application can be achieved.

Label applicator 10 can be constructed of various materials so long as those materials are sufficiently rigid and strong to perform the methods of label application that are described herein. For example, in some embodiments, label applicator is formed of aluminum or other high-strength metals, plastics, or composite materials.

Although first and second rollers 32, 34 are illustrated as being fixed in FIGS. 1-4, it should be understood that in other embodiments, it may be desirable to provide multiple movable rollers. Thus, in addition to moveable contact member 30, one or both of the other rollers 32, 34 can be moveable in a manner similar to that of moveable contact member 30. Thus, for example, second roller 34 could be configured to swing away from a label-receiving area, thereby creating an even larger area into which an article can be positioned. Once an article is in position within the label-receiving area, both the moveable contact member and the "moveable" second roller could be moved back towards the article to secure the article for the application of a label in the manner described herein.

As discussed above, various aspects of the label application process can be automated or computer controlled. In addition to those aspects discussed above, including, for example, controlling the feeding of labels, the movement of the moveable contact member, and the rotation of rollers to effect labeling of the articles, other aspects can be automated. For example, it should be understood that articles can be positioned within the label applicator in an automated manner. Thus, for example, a robotic system can be configured to position articles within the article-receiving area and remove those articles, either from the same direction from which the article was positioned within the label applicator or from another direction as described elsewhere herein.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. An apparatus for attaching labels to articles, the apparatus comprising:
- a first roller;
- a second roller;
- a moveable contact member;
- an actuator configured to move the moveable contact member from a first position to a second position, the moveable contact member being biased towards the second position and the actuator being configured to resist the biased movement of the moveable contact member;
- a label inlet opening for receiving a label;
- an article-receiving area defined by an area between the first roller, the second roller, and the moveable contact member when the moveable contact member is in the first position;
- a label-receiving area defined by an area between the first roller, the second roller, and the moveable contact member when the moveable contact member is in the second position; and
- a control system for controlling the actuator's movement of the moveable contact member from the first position to the second position, the control system being programmable to receive inputs that control the actuator's movement of the moveable contact member,
- wherein the article-receiving area is larger than the label-receiving area so that when an article with a cross-sectional area that is smaller than the article-receiving area is received within the article-receiving area it does not contact each of the first roller, the second roller, and the moveable contact member, and when the article is received within the label-receiving area, the article does contact each of the first roller, the second roller, and the moveable contact member.

2. The apparatus of claim 1, wherein the moveable contact member comprises a third roller.

3. The apparatus of claim 1, further comprising:
- a motor and at least one drive belt, the drive belt being configured to cause at least one of the first roller, the second roller, and the moveable contact member to rotate.

4. The apparatus of claim 1, further comprising a first sensor positioned adjacent the article-receiving area and configured to detect the presence of an article within the article-receiving area.

5. The apparatus of claim 4, further comprising a second sensor positioned adjacent the label inlet opening and configured to detect the presence of a label in the vicinity of the label inlet opening.

6. An apparatus for attaching labels to articles, the apparatus comprising:
- a first roller;
- a second roller;
- a moveable contact member;
- an actuator configured to move the moveable contact member from a first position to a second position;
- a label inlet opening for receiving a label;
- an article-receiving area defined by an area between the first roller, the second roller, and the moveable contact member when the moveable contact member is in the first position;
- a label-receiving area defined by an area between the first roller, the second roller, and the moveable contact member when the moveable contact member is in the second position;
- a platform that is moveable between a first position and a second position; and
- an opening located beneath the platform when the platform is in the first position,
- wherein the article-receiving area is larger than the label-receiving area so that when an article with a cross-sectional area that is smaller than the article-receiving area is received within the article-receiving area it does not contact each of the first roller, the second roller, and the moveable contact member, and when the article is received within the label-receiving area, the article does contact each of the first roller, the second roller, and the moveable contact member, and
- wherein, in the first position, the platform is positioned to support an article and, in the second position, the platform does not support the article, thereby permitting the article to pass through the opening.

7. The apparatus of claim 6, wherein the moveable contact member comprises a third roller.

8. The apparatus of claim 6, further comprising:
- a motor and at least one drive belt, the drive belt being configured to cause at least one of the first roller, the second roller, and the moveable contact member to rotate.

9. The apparatus of claim 6, further comprising a first sensor positioned adjacent the article-receiving area and configured to detect the presence of an article within the article-receiving area.

10. The apparatus of claim 9, further comprising a second sensor positioned adjacent the label inlet opening and configured to detect the presence of a label in the vicinity of the label inlet opening.

11. The apparatus of claim 10, further comprising a control system for controlling the movement of the actuator based on information received from the first and second sensors.

12. An apparatus for attaching labels to articles, the apparatus comprising:
- a first roller;
- a second roller;
- a moveable contact member;
- an actuator configured to move the moveable contact member from a first position to a second position;
- a label inlet opening for receiving a label;
- an article-receiving area defined by an area between the first roller, the second roller, and the moveable contact member when the moveable contact member is in the first position; and
- a label-receiving area defined by an area between the first roller, the second roller, and the moveable contact member when the moveable contact member is in the second position;
- a first sensor positioned adjacent the article-receiving area and configured to detect the presence of an article within the article-receiving area;
- a second sensor positioned adjacent the label inlet opening and configured to detect the presence of a label in the vicinity of the label inlet opening; and a control system for controlling the movement of the actuator based on information received from the first and second sensors, wherein the article-receiving area is larger than the label-receiving area so that when an article with a cross-sectional area that is smaller than the article-receiving area is received within the article-receiving area it does not contact each of the first roller, the second roller, and the moveable contact member, and when the article is received within the label-receiving area, the article does contact each of the first roller, the second roller, and the moveable contact member.

13. The apparatus of claim 12, wherein the moveable contact member comprises a third roller.

14. The apparatus of claim 12, further comprising:

a motor and at least one drive belt, the drive belt being configured to cause at least one of the first roller, the second roller, and the moveable contact member to rotate.

15. The apparatus of claim 1, wherein the input received by the control system comprises information from a sensor relating to the position of an article or label.

16. The apparatus of claim 15, wherein the control system can adjust a rotational speed of one or both of the first roller and second roller.

* * * * *